United States Patent
Dickerson et al.

(10) Patent No.: US 6,221,254 B1
(45) Date of Patent: *Apr. 24, 2001

(54) PURIFICATION OF LIQUID STREAMS USING CARBON DIOXIDE

(76) Inventors: J. Rodney Dickerson, P.O. Box 827, Scott, LA (US) 70583; Mark W. Moshier, 2437 Audubon La., Owens Cross Roads, AL (US) 35763

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,317

(22) Filed: Aug. 25, 1998

(51) Int. Cl.$^7$ ..................................................... B01D 21/01
(52) U.S. Cl. .......................... 210/705; 210/711; 210/718; 210/724; 210/905
(58) Field of Search ..................................... 210/703, 705, 210/710, 711, 718, 724, 738, 905

(56) References Cited

U.S. PATENT DOCUMENTS

| | | | | |
|---|---|---|---|---|
| 3,314,880 | * | 4/1967 | Rubin ..................................... | 210/905 |
| 3,725,267 | * | 4/1973 | Gelblum ................................ | 210/724 |
| 5,591,001 | * | 1/1997 | Ray et al. ............................. | 415/111 |

FOREIGN PATENT DOCUMENTS

| | | | |
|---|---|---|---|
| 2506314 | * | 9/1975 | (DE) . |
| 2201258 | * | 5/1974 | (FR) . |
| 55-165108 | * | 12/1980 | (JP) . |
| 57-207589 | * | 12/1982 | (JP) . |

* cited by examiner

Primary Examiner—David A. Simmons
Assistant Examiner—Frank M. Lawrence
(74) Attorney, Agent, or Firm—Kean Miller

(57) ABSTRACT

A method of purifying an aqueous liquid stream is provided, wherein the liquid stream is pressurized and contains proteinaceous materials, such as blood, and suspended solids, comprising the introduction of carbon dioxide into the liquid stream in a manner to reduce the pH of the liquid stream sufficient to cause coagulation of the proteinaceous materials. Specifically, it is intended that the pH of the liquid stream is reduced to a level below the isoelectric point of the proteinaceous materials, preferably at a level below pH 4.5. In a preferred method, the liquid stream is moved by a dissolved gas pump, wherein the carbon dioxide is introduced into the dissolved gas pump, and wherein a first portion of the gas is caused to dissolve within the liquid stream, and a second portion of the gas is caused to entrain within the liquid stream in the form of micro-fine bubbles. The method further preferably comprises reducing the pressure of the liquid stream in an amount sufficient to cause the further formation of bubbles which adhere to the proteinaceous materials which have coagulated and which reduces the pH of the liquid stream; recovering the gas which escapes the liquid stream; and removing the coagulated proteinaceous materials and suspended solids from the liquid stream. During the introduction of the gas into the liquid stream, shear forces are maintained at a level sufficient to minimize formation of emulsions of the proteinaceous materials.

10 Claims, 1 Drawing Sheet

PURIFICATION OF LIQUID STREAMS USING CARBON DIOXIDE

BACKGROUND OF THE INVENTION

I. Field of the Invention

The present invention relates generally to the treatment of wastewater, and other liquid waste streams, and more particularly to the removal of proteinaceous material and suspended solids from wastewater using only carbon dioxide as a combination of treatment chemical, separation method and anti-biological agent in a manner that conserves and reuses excess carbon dioxide efficiently.

II. Description of the Problem

Businesses engaged in the processing of food and other organic substances, such as poultry processing facilities, generate tremendous quantities of wastewater containing a wide range of dissolved organic fluids and suspended solids. In poultry processing operations, chickens are brought to the facility alive where they are hung upside down, have their throats slit to drain away blood, are scalded to remove feathers, then the internal organs removed, followed by plunging the carcass into a chilled water bath before further processing. Thus, contaminants are added to wastewater stream that may be suspended particles, such as feather pieces, emulsified and partially soluble materials like fats and oils, and dissolved materials such as blood proteins. For the purposes of this disclosure, the blood and other aforementioned biological matter containing proteins will be collectively referred to herein as "proteinaceous material." During further processing, other particulates such as marinades, oils, fats, breading, batter and seasonings, migrate to the wastewater stream. These substances may come from frying, grilling, roasting, steam cooking, impingement cooking, chilling, freezing and various material handling steps. In many instances, it is through the periodic sanitation phase when machinery is cleaned that many suspended solids enter the wastewater stream.

Another example of a facility wherein such wastewater is generated is in a fully-cooked poultry steam application, where 10,000 gallons per day of liquid enters the waste stream in a typical application. This equates to approximately 80,000 pounds per day at a ten percent (10%) solids content. Currently this level of solids enters the waste stream and places high demand on the treatment system.

The industry attempts to recover as much material as possible in each processing step for reuse by rendering it back into animal feed products. However, since water is a crucial component to the overall process, it invariably contains large amounts of material that must be removed prior to discharge to the environment. Indeed, in recent years, the rapid growth of the poultry processing industry has resulted in large volumes of water being generated in such processing facilities. Pressure is being brought to bear on the industry to suitably clean this water prior to discharge. New technologies, such as the one disclosed herein, may offer the potential to salvage edible materials for human or animal consumption at the point of application, thus resulting in overall decreases in water consumption and treatment chemicals.

The problems associated with the removal of such proteinaceous materials and suspended solids in wastewater streams are well known. Various techniques have been proposed and tried to treat the water with different degrees of success and associated costs. The most common technique has been to perform some mechanical treatment to remove coarse suspended solids and subject the water to both anaerobic and aerobic biological treatment. This technique is often chosen because of its relatively low capital cost. However, most processing facilities of this type make use of large amounts of disinfectants and hot water, which has a profound impact on the required biological processes that is difficult to control.

Because the chicken fecal material contains an abundance of sulfur-reducing bacteria, and because blood protein is also high in sulfur content, the anaerobic ponds typically used as a first step produce hydrogen sulfide gas and other odor compounds that are objectionable to the surrounding area. Furthermore, the anaerobic ponds do not efficiently process the waste and subsequently lose their effectiveness. Since these ponds are normally followed by aerobic treatment, their ineffectiveness results in increased contaminant loads on the aerobic process.

The increased loads on the aerobic system ultimately lead to a failure of the aerobic treatment to effectively treat the wastewater. Unfortunately, the poultry industry is faced with increasing the capacity of these facilities in the face of ever more stringent discharge limitations. Since these facilities all require significant amounts of land area, many are limited as to expansion options. Those without available land area are faced with using physical or chemical treatment techniques to try and achieve discharge water quality.

For example, the poultry industry currently employs the addition of chemicals to coagulate the suspended solids, as well as some type of clarification equipment to remove this material. As is common in this particular industry, some dissolved materials require a lowering of the pH of the stream to a point where optimum chemical reactions may proceed to cause the dissolved material to precipitate from the stream in the form of a suspended solid. This is particularly true in the case of blood products mixed into the waste stream. In order to accomplish this, the pH of the waste stream must be reduced to below about pH 4.5 at which level the blood proteins coagulate from solution. This is generally accomplished with an inexpensive inorganic acid, such as sulfuric or hydrochloric acid. In many instances, the pH of the stream and separated solids, after separation of the suspended solids from the stream, is below that pH limit suitable for reuse or discharge to another process or to the environment. When unacceptably low pH conditions exist, the pH of the treated stream or the separated solids must be increased to acceptable levels.

To return the pH to acceptable levels, a base material, again usually inorganic, is added which reacts with the acid. There are several problems associated with chemical treatment processes such as that just described, especially if the acidic pH level is below about pH 4.5. First, although the addition of the acid causes the pH to decrease, it may also bring about an interaction with the suspended and dissolved materials, which consumes the acid and which may create undesirable reaction products. Second, the precipitated material resulting from the reduction in pH will also be acidic in nature and, after separation, may be unsuitable for any reuse unless treated to return the pH to higher levels. Third, the addition of a base to either the liquid stream or the separated solids results in the formation of salts which may not be acceptable in reuse of the solids or the treated liquid. Also, the sedimentation clarifiers typically used in connection with chemical treatment techniques are ineffective in removing oils and grease. Therefore, most designers opt for some type of flotation clarifier as explained further below.

As an alternative to chemical treatment using acids, some facilities have turned to flotation clarifier processes whereby air is injected into the waste stream under pressure. At the appropriate time, the pressure within the chamber containing the wastewater is reduced, producing fine bubbles which adhere to the solids and cause them to float to the surface. The floating solids are then removed by conventional skimming equipment for later use or disposal. However, while those processes involving dissolved air do eliminate some of the problems of chemical treatment, other problems still remain. For example, the added air may promote the growth of bacteria in the separated solids, thereby causing odors and degradation of the material. As a result, the recovered solids may be unfit for reuse, especially in the case of such materials from food processing operations.

An example of physical and chemical treatment is U.S. Pat. No. 5,413,720 issued to Miller. Miller describes what may be considered the current industry practice for treating the wastewater, particularly in poultry operations, in an attempt to recover the material in a form suitable for reuse in food. While the Miller patent does make an effort to use chemical additives that are considered safe in animal food, it still relies on mineral acids to reduce the pH. Therefore, that process must contend with all the problems described previously herein in connection with the addition of acid.

For example, in chemical processes such as that described in Miller, the amount of acid needed to effect the pH reduction, together with the added polymers need to further coagulate all the suspended materials, adds an appreciable cost to the process. This is further complicated by the fact that the mineral acids degrade the proteins, as well as the polymers themselves to some extent, via oxidation. The resulting solids are increased by up to 35% in weight and exist in a partially degraded and highly acidic form, thereby making them generally unsuitable for rendering into animal foods. To further complicate matters, these solids must be neutralized with a base material before being made suitable to disposal into land applications. Also, the water, after clarification, must also be neutralized with a base material, usually sodium hydroxide or lime, to raise the pH to suitable values for discharge. This step not only adds more cost, but also results in even greater weight and volume to the solids for disposal, as well as additional dissolved salts in the water.

The following is a brief discussion of several patents which describe various prior art processes. U.S. Pat. No. 4,267,050, issued to Conway, et aL, relates to a process for removing solids from wastewater including dissolving gas having a solubility in water higher than that of air, preferably carbon dioxide, into an aqueous fluid stream at a pressure higher than a flotation zone in order to cause the gas to dissolve in the stream, and then expanding the pressurized stream into a flotation zone where pressure is released causing bubbles to form and adhere to insoluble impurities and thereby cause the contents to separate by flotation. The preferred source of carbon dioxide is from burning methane gas. Conceptually, a reduction in capital and operating costs are derived from the higher solubility of the carbon dioxide in water versus air and utilizing combustion gases as the source of the carbon dioxide which is presumed to be economical over purchase of pure carbon dioxide. No mention is made of reducing the pH of the wastewater stream by an amount sufficient to cause coagulation of blood proteins and other proteinaceous materials.

U.S. Pat. No. 4,289,628, issued to Disselbeck, et al., is drawn to a process for separating solids from liquids in food processing, poultry farms and the like using air without the use of flocculating agents but with a particular type of filter media. While the patent mentions the use of carbon dioxide as alternative to air, no mention is made of any manner by which the carbon dioxide is introduced into the system, nor what purpose it would serve other than as a flotation aid. A closed system is recommended for use with nitrogen or carbon dioxide, but only to the extent as to exclude oxygen and for no other purpose.

U.S. Pat. No. 2,350,111, issued to Hood, relates to clarification of waste liquids, and teaches the desirability of an initial introduction of carbon dioxide into the untreated liquid, rather than strong acids (which, it is taught, may be undependable and have a bactericidal effect). However, subsequently in the process of Hood, a chemical electrolyte is used for coagulation and sedimentation. It is apparent that the invention of Hood lacks the ability to introduce carbon dioxide in sufficient quantity to reach the isoelectric point of proteins that may be present.

U.S. Pat. No. 4,217,217, issued to Kay, et al., teaches treatment of alkaline waste water by introducing therein finely divided carbon dioxide by using diffusers. The focus of Kay was to use the carbon dioxide primarily to neutralize the alkaline wastewater, and to design the diffuser system and tank to utilize most of the carbon dioxide so that very little is wasted. There is no mention of reducing the pH of the wastewater stream by an amount sufficient to cause coagulation of proteinaceous materials.

U.S. Pat. No. 4,137,163, issued to Young, is directed to a process for treatment of waste streams which includes scrubbing hot combustion gas (containing carbon dioxide) with the effluent so as to produce a foam. For example, it is disclosed that the reducing atmosphere of the flue gas improves flocculation. This patent centers around using combustion gas to reduce the cost of carbon dioxide, and it does not suggest the lowering of the pH to cause coagulation of waste constituents.

U.S. Pat. No. 3,419,493, issued to Pangle, is drawn to a process for treating textile mill waste water, which includes bubbling through the wastewater supernatant from the floc and settling zone, a gas which contains carbon dioxide, in order to adjust the pH and form a foam. The idea is to use carbon dioxide in conjunction with air for the production of a foam to cause material to float.

U.S. Pat. No. 5,167,806, issued to Wang, describes a very complex system of compressor, pump and high speed, rotating tank with specific internals for dissolving and releasing gases in liquids. The focus of this patent is concerned with the high speed, rotating tank for contacting the gases with the liquid and its use in biological systems.

Although the foregoing description of the problems of wastewater treatment have been explained in connection with poultry processing facilities, such facilities are only a small part of the many applications of wastewater treatment involving physical and chemical treatment where pH lowering is needed, followed by increasing the pH to acceptable levels after clarification. There exists, therefore, a great need for a process to effectively treat these wastewater streams in an economical fashion that eliminates the use of mineral acids and bases, while minimizing the use of other chemicals, and which excludes the introduction of air into the separation process.

SUMMARY OF THE INVENTION

One object of the present invention is to eliminate the use of acids to lower the pH of a wastewater stream by introducing carbon dioxide under pressure in place of such acids.

Another object of the present invention is to eliminate the need for base neutralization of wastewater streams that were treated with acids by utilizing carbon dioxide under pressure in place of such acids and releasing the pressure to cause the carbon dioxide to leave the wastewater stream, thereby causing an increase in the pH of the treated liquid to acceptable levels.

Another object of the present invention is to eliminate the need for base neutralization of separated solids by utilizing carbon dioxide in the treatment process where the pressure on the solids is reduced causing the carbon dioxide to leave the solids, thereby causing an increase in the pH of the separated solids to acceptable levels.

Another object of the present invention is to utilize carbon dioxide under pressure in the treatment of wastewater streams to cause a destruction or deactivation of bacteria or other biological agents from the formation of acids of carbon dioxide in water.

Another object of the present invention is to utilize carbon dioxide to reduce the pH to a point where certain materials, such as blood proteins and/or added treatment chemicals, will coagulate and agglomerate the suspended materials, facilitating flotation and removal.

Another object of the present invention is to utilize carbon dioxide, first under pressure and in excess of solubility limits at that pressure, releasing from solution at reduced pressures to cause separation within a clarification device for the removal of coagulated and suspended materials while excluding oxygen or air from the process.

Another object of the present invention is to provide a means of applying the carbon dioxide to the liquid stream in a manner that does not cause shearing action while affording maximum mass transfer by creating micro-fine bubbles of carbon dioxide within the waste stream.

Another object of the present invention is to provide a means of recovering the carbon dioxide used in the treatment process for reuse such that only the material required for chemical reactions is lost in the process.

Therefore, a method of purifying an aqueous liquid stream is provided, wherein the liquid stream is pressurized and contains proteinaceous materials, such as blood, and suspended solids, comprising introducing a gas comprised predominantly of carbon dioxide into the liquid stream, wherein the gas is introduced in a manner to reduce the pH of the liquid stream sufficient to cause coagulation of the proteinaceous materials. Specifically, it is intended that the pH of the liquid stream is reduced to a level below the isoelectric point of the proteinaceous materials, preferably at a level below pH 4.5. In a preferred method, the gas is comprised entirely of carbon dioxide.

Also, in a preferred method, the liquid stream is moved by a dissolved gas pump, wherein the gas is introduced into the dissolved gas pump, and wherein a first portion of the gas is caused to dissolve within the liquid stream, and a second portion of the gas is caused to entrain within the liquid stream in the form of micro-fine bubbles. The method further preferably comprises, after the introduction of the gas into the liquid stream, reducing the pressure of the liquid stream in an amount sufficient to cause the further formation of bubbles which adhere to the proteinaceous materials which have coagulated and which reduces the pH of the liquid stream; recovering the gas which escapes the liquid stream; and removing the coagulated proteinaceous materials and suspended solids from the liquid stream, leaving a purified liquid stream. The method further preferably comprises reducing the pressure of the coagulated proteinaceous materials and the suspended solids in an amount sufficient to cause maximum release of the gas from the coagulated proteinaceous materials and the suspended solids; and recovering the gas which escapes from the coagulated proteinaceous materials and the suspended solids. The method further preferably comprises reducing the pressure of the purified liquid stream in an amount sufficient to cause maximum release of the gas from the purified liquid stream; and recovering the gas which escapes from the purified liquid stream.

DETAILED DESCRIPTION OF THE PREFERRED EMBODIMENTS

Figure 1:
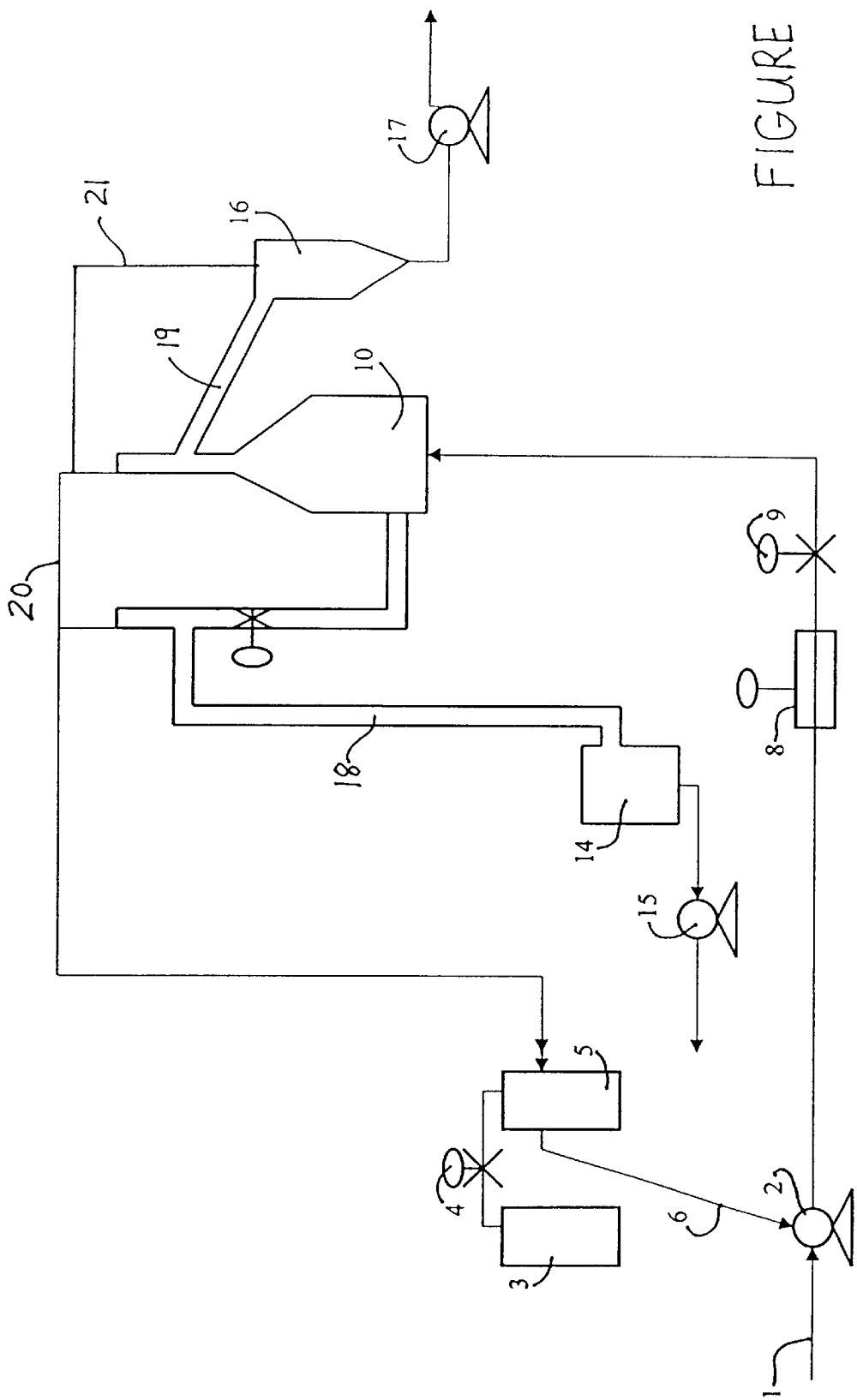
FIG. 1 is a schematic diagram of the major components of a preferred embodiment of the present invention.

The present invention utilizes carbon dioxide as the primary chemical to bring about the purification of a liquid waste stream while conserving the carbon dioxide. The preferred methods which use the present invention shall be described with reference to FIG. 1. Generally speaking, the carbon dioxide is applied in a manner to cause a sufficient reduction in the pH of the stream from dissolving the carbon dioxide at pressure, thereby causing coagulation of certain proteinaceous contaminants and a simultaneous attachment of excess carbon dioxide gas in the form of micro-fine bubbles to such coagulated materials and other suspended solids. The carbon dioxide bubbles which adhere to the solids cause them to float so that they may be separated from the liquid stream. The pressure is then reduced independently for both the liquid stream and the separated solids so that the unreacted carbon dioxide can be released and recovered for reuse.

Turning now to FIG. 1, a schematic diagram is shown which depicts the major components of the present inventive method. The raw liquid waste stream 1, such as wastewater containing the proteinaceous materials, enters a dissolved gas pump 2 which has inputs for both the liquid waste stream 1 and a gas 3. The gas source 3 is a conventional pressurized tank containing a liquid form of the gas for transfer to the dissolved gas pump 2 through gas feed line 6. As is common, a pressure regulator 4 is fluidically connected between gas source 3 and gas feed line 6 to regulate the flow of gas into the dissolved gas pump 2. It is also preferred that a gas accumulator 5 be fluidically connected between pressure regulator 4 and gas feed line 6 so that recovered gas from the treatment process, as explained further below, may be reused with the dissolved gas pump 2.

Preferably, the gas 3 is one in which the predominant gas is carbon dioxide, such as greater than fifty percent (50%), and more preferably the gas 3 is comprised entirely of carbon dioxide. Dissolved gas pump 2 may be any pump which is capable of introducing dissolved carbon dioxide into the liquid waste stream 1 in an amount to reduce the pH of the liquid waste stream 1 sufficient to cause coagulation of any proteinaceous materials in the liquid waste stream 1. In practice, it has been shown that the pH of the liquid waste stream 1 must be reduced to about pH 4.5 or lower to cause coagulation of such materials. As will be understood, the objective of reducing the pH of the liquid waste stream 1 can only be satisfied if the dissolved gas pump 2 is capable of transferring sufficient dissolved carbon dioxide into the liquid waste stream 1 to form carbonic acid, $HCO_3$.

Before proceeding with the remaining description of the present inventive method, it is necessary to provide further detail on the preferred means of introducing the carbon dioxide, as well as the reasons for why certain pumps will achieve better results than others. Examples of a dissolved gas pump 2 suitable for use with the present inventive method are those described in U.S. Pat. No. 4,335,886, issued to Frey, et al., and in U.S. Pat. No. 5,591,001, the disclosures of which are incorporated herein by reference. These pumps in particular introduces the gas into the liquid in a manner that minimizes shearing action and simultaneously creates micro-fine bubbles. The variation of the pump 2 as disclosed in U.S. Pat. No. 5,591,001 is the inclusion of small vanes on the side of the pump impeller opposite to the liquid pumping side. The vanes are constructed in such a manner as to cause an outward flow from the impeller shaft across the reverse face of the impeller to the outside edge of the impeller. The impeller is set into the pump housing in such a fashion as to have very close proximity to the pump back casing.

When the impeller spins within the pump casing, drawing liquid into the pump in the center of the impeller due to normal pump vane construction, the vanes on the reverse side of the pump impeller are set to move material outward axially. This construction, as disclosed in U.S. Pat. No.

4,335,886, keeps material away from the pump seal and creates a very low pressure at the pump shaft on the reverse side of the impeller in the vicinity of the shaft seal.

If the normal pump seal housing is penetrated with a conduit to allow the introduction of a gas into the area on the back side of the impeller in the vicinity of the shaft, the gas will be drawn into the pump and move across the back side of the impeller to accelerate and combine with the liquid moving across the front of the impeller. The construction of the vanes, together with the tolerances and the speed of the impeller are set to move a maximum amount of gas under a given set of flow conditions. Where the gas and liquid meet and combine along the circumference of the impeller, a unique phenomena occurs. Although the inventors of the pump are concerned primarily with the introduction of gases, we have determined through experimentation that the gas and liquid combine in such a way as to minimize the normal shear forces that exist at this point resulting from the acceleration of the liquid as it leaves the edge of the impeller.

While not wishing to be bound by any particular theory of operation advanced herein, it will be helpful to those skilled in the art to understand why the above mentioned dissolved gas pumps 2 are particularly suitable for use with the present invention. One must first consider the nature of the boundary layer of the fluid at the impeller surface. It is well known that a body moving through a fluid creates a series of vortices at the edge. What has only come to be known in recent years due to work with chaos theory is that these vortices are themselves composed of ever smaller vortices even unto a level that cannot be measured Since a vortex is a rotating mass with a low pressure area at its center, one can envision the vortices moving across the face of the impeller that are accelerating in core speed as they move toward the edge of the impeller.

In the case of only liquid being moved through the pump, if one examines a single vortex leaving the edge of the impeller, it will collapse as it enters the body of the fluid since it no longer has a solid material to impede a flow into the low pressure area. This collapse is a high energy operation and, as such, since energy is conserved, results in high shear forces as the vortices compete for material in their collapse. Since vortices form in response to the movement of the solid through the fluid, and the direction of the vortices rotation will be opposite on opposing sides of a rotating pump impeller, the vortices leaving opposite sides will tend to cause a shear if the fluid on both sides of the impeller is a liquid. This occurs because the fluid is a liquid and is incompressible. Therefore, the counter-rotating vortices collide, and their energy is dissipated in a shearing action. This shearing action, especially in the presence of oil and grease, which will tend to create undesirable emulsions in the exiting liquid waste stream. This is a typical result when a conventional centrifugal pump is used.

On the other hand, if the fluid on the back side of the impeller is a gas rather than a liquid, as used in the present invention, a different phenomenon occurs, because the gas is compressible and the energy from collision of the counter-rotating vortices is expended in the energy of compression of the gas as it enters the vortex of the liquid. Since the gas is traveling in the opposite direction to the liquid, and the energy within the liquid is much greater than the gas due to difference in mass, the gas will move smoothly into the liquid. The energy of the liquid vortices is expended in drawing in and compressing the gas, which greatly reduces the shearing action. This is highly advantageous in the present invention, because when such shearing action is avoided, there is much less of tendency to create emulsions of the oil and grease contained within the liquid waste stream.

Another unique aspect of this action is that the liquid vortices are quite minute, and the amount of gas needed to fill the liquid vortex is also correspondingly small. The small volume of gas, coupled with the act of compression, results in extremely small, micro-fine bubbles on the order of 150 microns in diameter. Furthermore, these bubble will allow for rapid, virtually instantaneous, transfer to solubility limits of any gas that is soluble in the liquid at a given temperature and pressure. Excess undissolved gas will simply remain in the form of micro-fine bubbles under pressure, which can be used for flotation purposes as further described herein.

A further unique aspect of this phenomenon is that any solid particulate or droplets of emulsified substances will be drawn into the center of the micro-vortices of the liquid. As such, when the gas is drawn into the same vortex as the liquid leaves the face of the impeller, the gas will engulf and attach to the solid or droplets. This is a very strong attachment when compared to other means of attaching a bubble to a particle or droplet with a liquid.

An additional advantage of the particular dissolved gas pumps 2 referred to above is that since the pressures generated behind the impeller where the gas enters is quite low, the pump 2 can draw in the carbon dioxide in an unassisted manner, thereby eliminating the need for a gas compressor in many instances due to its effect as a vacuum pump.

In summary, if one considers that the pump 2 will draw in gases, such as carbon dioxide, without the need for other gas pumping means, and that such action can be accomplished in a manner that does not create the shearing action normally associated with centrifugal pumps, its distinct advantages in a process involving flotation separation with gas recovery should be readily apparent to those having skill in this area. Furthermore, because the aforementioned pump 2 is combined with the conical-topped clarifier, as described in further detail below, and employs carbon dioxide gas as both a chemical and flotation means, virtually all of the carbon dioxide can be utilized in an efficient manner.

Returning now to the process as it relates to FIG. 1, the various proteinaceous materials and suspended solids within the liquid waste stream, which now contains a substantial amount of carbon dioxide dissolved therein, will coagulate and agglomerate. As stated earlier, this effect is achieved because the high concentration of carbon dioxide generates enough carbonic acid to reduce the pH of the liquid waste stream to a point below the isoelectric point of the proteinaceous materials. Another advantage to reducing the pH in this manner is that the resulting acidic nature of the liquid waste stream kills or deactivates undesired bacteria and other microbial agents that may be present. The coagulated contaminants and other suspended materials are further surrounded by the excess undissolved micro-fine bubbles of carbon dioxide, which become attached thereto under a given pressure. In experiments conducted by the inventors, the pressure of the liquid waste stream is maintained at approximately 100 psig after it leaves the pump 2 in order to allow the dissolved carbon dioxide to fully react with the proteinaceous materials to achieve as much coagulation as possible.

Optionally, a pH monitor 8 may be used downstream of the pump 2 to confirm the desired reduction in pH level of the liquid waste stream. Also, a back pressure control valve 9 is employed along the conduit through which the liquid waste stream travels so that excessive pressure due to release of the carbon dioxide may be alleviated if necessary.

After most of the coagulation has taken place, the liquid waste stream under pressure is transferred to a clarifying chamber 10 wherein the coagulated solids are separated from the liquid portion of the liquid waste stream. Generally speaking, the pressure on the liquid waste stream is reduced inside the clarifying chamber 10 so that dissolved carbon dioxide will form more bubbles and adhere to the coagulated proteinaceous materials suspended solids. The reduction in pressure, and the corresponding release of carbon dioxide, naturally causes the pH of the liquid waste stream to increase within the clarifying chamber 10.

A preferred example of such a clarifying chamber 10 which provides for the capture and recovery of flotation gases is described in U.S. Pat. No. 5,055,184, issued to Carpenter, et al., the disclosure of which is incorporated herein by reference. This apparatus uses a conical top for the separation vessel, thereby providing a means to recover the flotation gases and perform a separation of the solids from the liquid. The clarified liquid then flows through a clear liquid conduit 18 into a treated liquid vessel 14 where the pressure is further reduced to or below atmospheric pressure for the release of any remaining carbon dioxide. Treated liquid which has released its carbon dioxide is then transferred to any desired location by a treated liquid pump 15 for reuse or discharge. Likewise, coagulated proteinaceous materials and suspended solids flow through a sludge line 19 into a sludge vessel 16 where the pressure is further reduced to or below atmospheric pressure for the release of any remaining carbon dioxide. Sludge which has released its carbon dioxide is then transferred to any desired location by a sludge pump 17 for reuse or discharge. Importantly, these reductions in pressure, in the case of the treated liquid and the solids, causes most or all of the dissolved carbon dioxide to be released from solution, which further reduces the pH of the liquid and the solids. The ability to return these materials to neutral pH levels, without the use of bases or other undesirable compounds, is highly advantageous in permitting reuse of the liquid and the solids for other purposes.

The carbon dioxide is recovered through conduits 20,21 above each of clarifying chamber 10, treated liquid vessel 14, and sludge tank 16, whereupon it is transferred to the accumulator 5 previously referred to herein. Alternatively, the carbon dioxide may also be recovered utilizing standard gas pumps such as compressors or vacuum pumps.

Although the foregoing description of the present inventive method describes the dissolved gas pump 2 as being ideally suited to deliver the amount of gas required to adequately reduce the pH of the liquid waste stream, other delivery apparatuses are possible. For example, in my previous patents, U.S. Pat. Nos. 5,397,480 and 5,458,789, the disclosures of which are incorporated herein by reference, both teach the use of a special eductor as a means of contacting a gas with a liquid in a highly efficient manner to achieve maximum solubility and produce micro-fine bubbles. An eductor of this type, or another of suitable design, may be used to apply carbon dioxide to a portion of the treated liquid in the treated liquid vessel 14, and then mix the resulting liquid with the incoming liquid waste stream, under pressure, to achieve the desired dissolved and excess carbon dioxide content in the combined streams. Supplemental carbon dioxide would be added via a diffuser into a pressurized recycle tank.

Depending upon conditions, it should also be understood that the foregoing process may require two or more separation steps which may consist of filters or chambers used to effect the desired removal of the coagulated and suspended solids. The type and number of separation steps will vary with the type of liquid stream being treated. The separation step(s) may take the form of a filter, simple closed tank or some type of device employing centrifugal forces generated by spinning the liquid in a controlled fashion. Of course, these closed separation step(s) would include appropriate piping to recover the liberated carbon dioxide for reuse.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A method of purifying a liquid stream, wherein said liquid stream is pressurized and contains proteinaceous materials and suspended solids, comprising:

(a) introducing a gas comprised predominantly of carbon dioxide into said liquid stream, wherein said gas is introduced in a manner to reduce the pH of the liquid stream sufficient to cause coagulation of said proteinaceous materials;

(b) wherein said liquid stream is moved by a dissolved gas pump, wherein said gas is introduced into said dissolved gas pump, and wherein a first portion of said gas is caused to dissolve within said liquid stream, and a second portion of said gas is caused to entrain within said liquid stream in the form of micro-fine bubbles.

2. The method of claim 1, wherein said pH of said liquid stream is reduced to a level below the isoelectric point of said proteinaceous materials.

3. The method of claim 2, wherein said pH of said liquid stream is reduced to a level below pH 4.5.

4. The method of claim 1, wherein said proteinaceous materials include blood.

5. The method of claim 1, wherein said gas is comprised entirely of carbon dioxide.

6. The method of claim 1, further comprising:

(a) after said introduction of said gas into said liquid stream, reducing the pressure of said liquid stream in an amount sufficient to cause the further formation of bubbles which adhere to said proteinaceous materials which have coagulated and which reduces the pH of said liquid stream;

(b) recovering said gas which escapes said liquid stream;

(c) removing said coagulated proteinaceous materials and said suspended solids from said liquid stream, leaving a purified liquid stream.

7. The method of claim 6, further comprising:

(a) reducing the pressure of said coagulated proteinaceous materials and said suspended solids in an amount sufficient to cause maximum release of said gas from said coagulated proteinaceous materials and said suspended solids; and (b) recovering said gas which escapes from said coagulated proteinaceous materials and said suspended solids.

8. The method of claim 6, further comprising:

(a) reducing the pressure of said purified liquid stream in an amount sufficient to cause maximum release of said gas from said purified liquid stream; and (b) recovering said gas which escapes from said purified liquid stream.

9. The method of claim 1, wherein said liquid stream is an aqueous liquid stream.

10. The method of claim 1, wherein during said introduction of said gas into said liquid stream, shear forces on said liquid stream are maintained at a level sufficient to minimize formation of emulsions of said proteinaceous materials.

* * * * *